H. WHITTINGHAM.
Sectional Steam-Generator.
No. 6,262. Reissued Jan. 26, 1875.
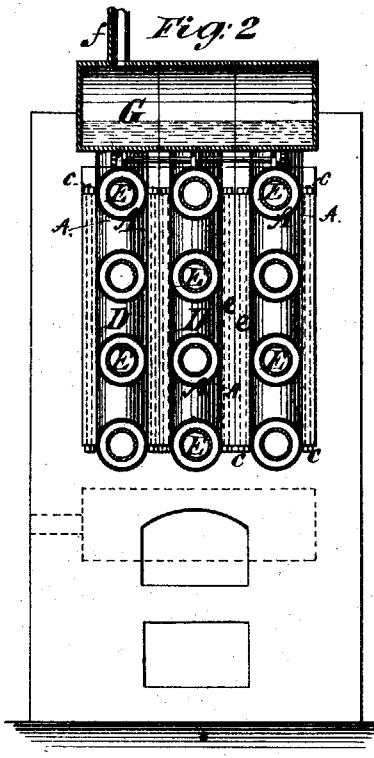
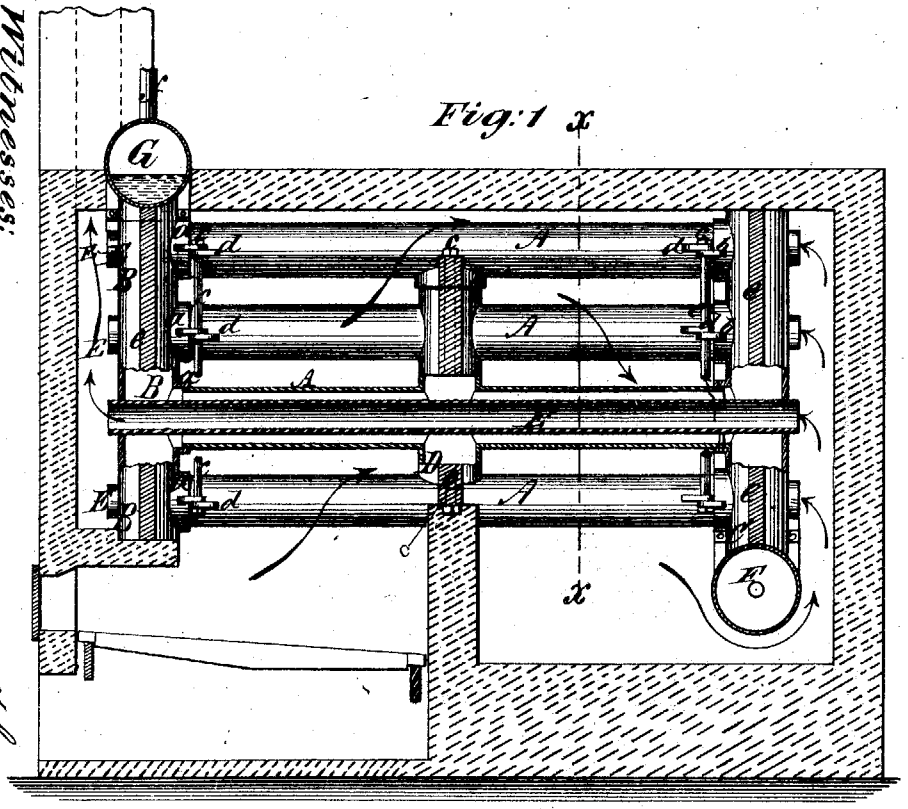
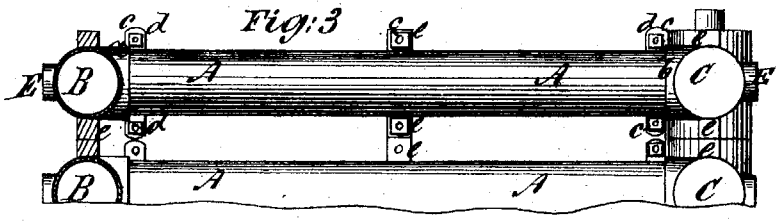
Witnesses:
Michael Ryan,
Fred Haynes
Harry Whittingham
by his Attorneys
Brown & Allen
THE GRAPHIC CO. PHOTO-LITH. 39 & 41 PARK PLACE, N.Y.

UNITED STATES PATENT OFFICE.

HARRY WHITTINGHAM, OF BROOKLYN, NEW YORK.

IMPROVEMENT IN SECTIONAL STEAM-GENERATORS.

Specification forming part of Letters Patent No. 91,395, dated June 15, 1869; reissue No. 6,262, dated January 26, 1875; application filed December 23, 1874.

*To all whom it may concern:*

Be it known that I, HARRY WHITTINGHAM, of Brooklyn, in the county of Kings and State of New York, formerly of the city, county, and State of New York, have invented certain new and useful Improvements in Steam-Generators; and I do hereby declare that the following is a full, clear, and exact description thereof, reference being had to the accompanying drawing making part of this specification.

This invention relates to sectional steam boilers or generators; and has for its main object the obtainment of an extensive heating-surface, so as to produce steam rapidly and with great economy of fuel.

The invention consists, first, in a combination, in each boiler-section, of front and rear upright or end tubes, a series of longitudinal or connecting tubes, and smoke-flues passed both through the longitudinal and end tubes. The invention also consists in a sectional steam-generator, in which each section is composed of front and rear upright or end tubes, one or more intermediate upright tubes, a series of longitudinal or connecting tubes, and smoke-flues fitted to pass through the longitudinal and upright tubes. Furthermore, the invention consists in certain novel means of connecting the tubes of one section with each other, as hereinafter more fully described.

Figure 1 represents a sectional side elevation of a steam-generator constructed in accordance with my invention. Fig. 2 is a vertical transverse section of the same on the line *x x*. Fig. 3 is a partial plan or top view thereof, partly in section.

Each section of the boiler is composed of a number of longitudinal water or steam-generating tubes, A A, disposed one above the other, and connected in front and rear by upright or end water-tubes B C; also, if desired, by one or more upright tubes between their front and rear ends, as shown in Fig. 1.

In the example illustrated in the drawing, the longitudinal or connecting tubes are horizontal, and the upright tubes vertical and straight, such arrangement serving as well as any other to explain the invention. Under this disposition and construction of said parts, as the tubes of any one section are all vertically above each other, it is evident that each section will have the width of one tube, as shown in Fig. 2, which represents three sections of the boiler side by side.

The front end or upright tubes B and the rear end or upright tubes C are each formed with elbows or sockets *b*, to receive within them the opposite ends of the longitudinal or connecting tubes A. The latter tubes are then connected with the end tubes B C by bolts *c c*, made to pass through ears *d d* on the sides of the elbows and longitudinal tubes, thereby forming a rigid tubular framework. On the sides of the tubes B C are formed projecting ribs *e e*, which, when two boiler-sections are placed side by side, form, in connection with said end tubes, transverse partitions, through which the products of combustion cannot pass. Longitudinally through or within the tubes A are fitted smaller pipes E. These pipes, which are open at both ends, form smoke-flues, and not only pass through the longitudinal tubes A, but also through the upright or end tubes B C. A series of such boiler-sections being put together within a suitable fire-proof structure will form a complete boiler when connected with each other, as, for instance, by transverse pipes F G. The transverse pipe F is arranged in the rear part of the boiler, and is connected with the tubes C, and receives water by suitable means, so as to supply all the tubes of the several sections with the requisite amount of water. The transverse pipe G is arranged in the front part of the boiler, and is connected with the upper portions of the end tubes B to receive the steam from the several water or steam-generating tubes. From this transverse pipe or steam-drum G the steam may be supplied for use as required by a pipe, *f*. The products of combustion from the furnace pass up between the tubes B C through all the sections, enveloping all the longitudinal tubes A, and then pass over the front or rear partitions formed by the upright tubes and their ribs to one end of the structure, and thence backward or forward through the flues E. The water in the longitudinal tubes A, also the water in the upright tubes, is thus heated both from the outside and inside. The intermediate upright tube D of each section is made in pieces to connect with the tubes A, or the latter may be made sectional to enter the tube D, as may be desired. The fastening of the longitudinal tubes with the intermediate upright tubes may also be effected by means of bolts *c* and ears *d*, or the bolts may pass, as shown, through the sectional or side ribs *e*—that is, supposing the intermediate tubes D to be provided with side ribs. Said tubes D are so provided with side ribs to form an intermediate partition whenever another passage for the gaseous products of combustion is desired. Such is the construction represented in Fig. 1, and in this case the smoke may pass up between the intermediate and front partitions down between the intermediate and rear partitions, and from thence through the flues E to the chimney. However, this intermediate partition, when used, may simply be constructed to brace the tubes A, and not to form an additional smoke-channel.

I claim—

1. The combination, in each boiler-section, of front and rear upright or end tubes, a series of longitudinal or connecting tubes, and smoke-flues passed both through the longitudinal and end tubes, substantially as specified.

2. A sectional steam-generator, in which each section is composed of front and rear upright or end tubes, one or more intermediate upright tubes, a series of longitudinal or connecting tubes, and smoke-flues fitted to pass both through the longitudinal and upright tubes, essentially as shown and described.

3. The ears *d d*, formed on the tubes A, B, and C, when arranged as described, to admit bolts *c* for securely connecting the tubes of each or any one section of the boiler, essentially as shown and described.

HARRY WHITTINGHAM.

Witnesses:

B. W. HOFFMAN,

A. J. DE LACY.